O. J. ZIEGLER.
RESILIENT VEHICLE WHEEL.
APPLICATION FILED AUG. 19, 1916.
1,292,949.
Patented Jan. 28, 1919.
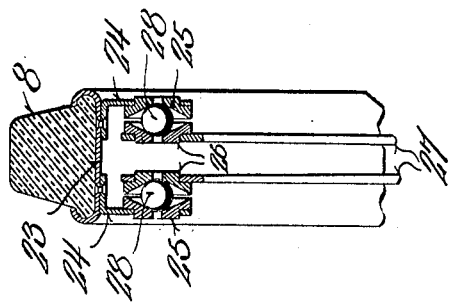
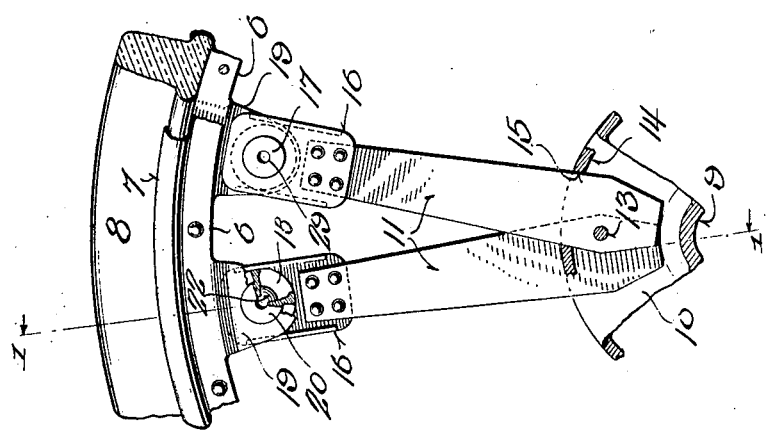
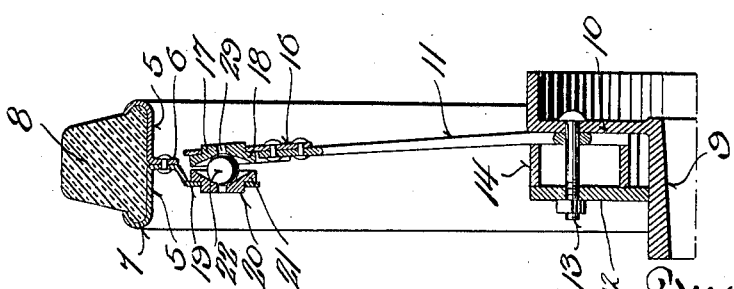

UNITED STATES PATENT OFFICE.

OSCAR J. ZIEGLER, OF MILWAUKEE, WISCONSIN.

RESILIENT VEHICLE-WHEEL.

1,292,949.   Specification of Letters Patent.   Patented Jan. 28, 1919.

Application filed August 19, 1916. Serial No. 115,756.

*To all whom it may concern:*

Be it known that I, OSCAR J. ZIEGLER, a citizen of the United States, and resident of Milwaukee, in the county of Milwaukee and State of Wisconsin, have invented certain new and useful Improvements in Resilient Vehicle-Wheels; and I do hereby declare that the following is a full, clear, and exact description thereof.

The present invention relates to new and useful improvements in resilient vehicle wheels, wherein the resiliency is procured by metallic springs, and is more particularly directed to wheels of that type wherein the resilient connection between the hub and tire portions is procured by cam members resiliently urged together and preferably disposed in an annular series between the hub and rim of the wheel.

It is in general the object of this present invention to simplify the structure and to improve the efficiency of wheels of this character, and inasmuch as a disadvantage present in wheels of this character heretofore contemplated is the provision of laterally extending spring members associated with the annular series of cam members, procuring an undesired width of the wheel structure adjacent its tire, it is more specifically an object of the present invention to provide an arrangement wherein the spring members for the cam portion extend in the plane of the wheel.

A further object of the invention, which compasses the foregoing object, is the provision of a wheel of the character described including resilient spoke members for procuring the operative coaction of the cam portions.

With the above and other objects and advantages in view, the invention resides more particularly in the novel combination, arrangement and formation of parts more particularly hereinafter described and particularly pointed out in the appended claim.

In the drawings:

Figure 1 is a transverse sectional view through a portion of the wheel, as indicated by the radially disposed section line 1—1 of Fig. 2;

Fig. 2 is a side elevation of a portion of the wheel, with parts broken away to more clearly disclose the structure;

Fig. 3 is a transverse radial sectional view through the rim portion of a slightly modified form of wheel structure.

Referring now more particularly to Figs. 1 and 2 of the drawings, the tire portion of the wheel comprises a pair of annular rim plate sections 5 having their inner adjacent edges inwardly directed at 6 and secured together, and their outer edges directed outwardly at 7 to hold a tire 8, which may be of any desired nature. The hub portion of the wheel comprises a hub body 9 provided with an annular flange 10, and to secure a series of radial spokes 11 to the hub portion of the wheel an annular disk 12 is slidable on the hub body and bolts 13 are passed through the disk and through the spoke ends and through the flange 10. Disposed between the disk 12 and flange 10 are spaced outer and inner spoke-holding bands 14 which are provided alternately in their side edges with corresponding series of recesses 15 receiving the spoke ends, whereby they are rigidly secured in staggered relation to the hub. It will however be appreciated that any desired means of securing the spokes to the hub may be procured.

These spokes 11 comprise flat resilient bars, and to procure cam connections between the outer ends of the spokes and the tire portion of the wheel, plates 16 are secured to and project outwardly from the outer end of the spokes and are apertured to receive bosses 17 formed on cup-shaped cam members 18, the side edges of the plates 16 being laterally turned to strengthen said plates.

From the flange 6 of the rim portion of the wheel a plurality of ears 19 extend radially inwardly toward the hub portion, said ears 19 being alternately and oppositely offset, whereby to provide each of the same with a shoulder. Each ear 19 is also provided with an aperture to receive a boss 20 formed on a cup-shaped member 21, one of said members 21 being disposed for coöperation to a corresponding cup-shaped member 18 and in opposition thereto. Between each corresponding pair of cup-shaped members 18 and 21 is disposed a ball 22.

The outer ends of the spokes are resiliently urged inwardly toward corresponding ears 19, and thus upon pressure being exerted on the hub of the wheel, the resiliency of the spokes is imparted to the tire portion of the wheel by the camming action of the opposed pairs of cup members and the balls 22 disposed therein, it being noted that the resilient action of the spokes is distributed entirely around the wheel, due to the spherical form of the opposed cam faces. From Fig. 1 it will be seen that each ear 19 is offset in the direction of the inclination of its corresponding spoke whereby the end of the latter or its member 18 may engage the shoulder of the former to limit the movement of one with respect to the other. The present wheel thus combines the advantages of the spring spoke type of wheel heretofore contemplated, and the advantages of the cam operative types, and eliminates various disadvantages of both types.

In Fig. 3 is shown a slightly modified form of wheel wherein a single rim band 23 is provided which has secured to its side portions inwardly extending flange plates 24 carrying transversely alined pairs of cup members 25 co-acting with cup members 26 carried by transversely alined pairs of spokes 27, by the disposition of balls 28 therebetween. This form obviously provides for a greater degree of spring action by the provision of a larger number of spokes.

To prevent the accumulation and caking of dirt in the cup members, which would lessen the cam action thereof, each cup member is provided with an axial opening 29 therethrough.

Although not specifically shown, it will be appreciated that in practice any suitable casing may be utilized to protect the cam structure of the wheel, and it is further understood that various modifications of the structure heretofore described may be resorted to in practice, to meet differing conditions of use, the essential feature of the invention residing in the provision of laterally resilient spoke members having cam connections with the tire portion of the wheel, whereby the spoke members are rigid in the plane of the wheel to provide a maximum degree of strength, and further whereby the wheel has its tire and hub portions resiliently connected to meet both vertical and horizontal strain.

I claim:

A spring wheel comprising in combination, a rim section having an inwardly extending annular flange, a hub section, resilient spokes extending radially from the hub section and alternately inclined in opposite directions, a plurality of ears extending inwardly from said flange and toward the hub section, said ears being oppositely alternately offset to provide each with a shoulder, one ear being disposed in opposition to each spoke for coöperation therewith, each of said ears being offset in the direction of the inclination of its corresponding spoke, cup-shaped members carried by the ears and spokes and forming a part thereof, and a ball disposed between each corresponding pair of cup-shaped members, said balls being adapted to slidably connect the spokes and ears, the movement of the former being limited by the engagement of the end portions thereof with said shoulders.

In testimony that I claim the foregoing I have hereunto set my hand at Milwaukee, in the county of Milwaukee and State of Wisconsin.

OSCAR J. ZIEGLER.